United States Patent
Jourdan

(10) Patent No.: US 10,414,494 B2
(45) Date of Patent: *Sep. 17, 2019

(54) SYSTEMS AND METHODS FOR RELIABLE RELATIVE NAVIGATION AND AUTONOMOUS FOLLOWING BETWEEN UNMANNED AERIAL VEHICLE AND A TARGET OBJECT

(71) Applicant: Wing Aviation LLC, Mountain View, CA (US)

(72) Inventor: Damien Bruno Jourdan, San Jose, CA (US)

(73) Assignee: Wing Aviation LLC, Mountain View, CA (US)

(*) Notice: Subject to any disclaimer, the term of this patent is extended or adjusted under 35 U.S.C. 154(b) by 217 days.

This patent is subject to a terminal disclaimer.

(21) Appl. No.: 15/685,478

(22) Filed: Aug. 24, 2017

(65) Prior Publication Data

US 2018/0002018 A1    Jan. 4, 2018

Related U.S. Application Data

(63) Continuation of application No. 14/559,365, filed on Dec. 3, 2014, now Pat. No. 9,896,202.

(51) Int. Cl.

| B64C 39/02 | (2006.01) |
| G05D 1/00 | (2006.01) |
| G05D 1/04 | (2006.01) |
| G05D 1/10 | (2006.01) |

(Continued)

(52) U.S. Cl.
CPC ......... *B64C 39/024* (2013.01); *G05D 1/0088* (2013.01); *G05D 1/042* (2013.01); *G05D 1/101* (2013.01); *G05D 1/102* (2013.01);
*G08G 5/0069* (2013.01); *G08G 5/0086* (2013.01); *G08G 5/045* (2013.01); *B64C 2201/024* (2013.01); *B64C 2201/108* (2013.01); *B64C 2201/127* (2013.01); *B64C 2201/141* (2013.01)

(58) Field of Classification Search
CPC .... B64C 39/024; G08G 5/0086; G08G 5/045; G08G 5/0069; G05D 1/0088; G05D 1/042; G05D 1/101
USPC ........................................ 701/3, 11
See application file for complete search history.

(56) References Cited

U.S. PATENT DOCUMENTS

| 9,056,676 B1 | 6/2015 | Wang |
| 2014/0257595 A1 | 9/2014 | Tillmann |

(Continued)

*Primary Examiner* — Nadeem Odeh
(74) *Attorney, Agent, or Firm* — McDonnell Boehnen Hulbert & Berghoff LLP

(57) ABSTRACT

A method for navigating an airborne device relative to a target comprises detecting, at an optical detector on the airborne device, an optical signal generated by one or more LEDs on the target; comparing the detected optical signal with a previously-detected optical signal; determining, based on the comparison, a change in location of at least one of the airborne device or the target; adjusting a position of the airborne device based on the determined change in location; predicting a movement of the target based on information indicative of at least one of a position, a rotation, an orientation, an acceleration, a velocity, or an altitude of the target, wherein the position of the airborne device is adjusted based on the predicted movement; detecting an obstacle in a flight path associated with the airborne device and adjusting a position of the airborne device based on detected obstacle information.

20 Claims, 9 Drawing Sheets

(51) Int. Cl.
*G08G 5/00* (2006.01)
*G08G 5/04* (2006.01)

(56) References Cited

U.S. PATENT DOCUMENTS

2015/0205301 A1   7/2015   Gilmore et al.
2016/0018822 A1   1/2016   Nevdahs et al.

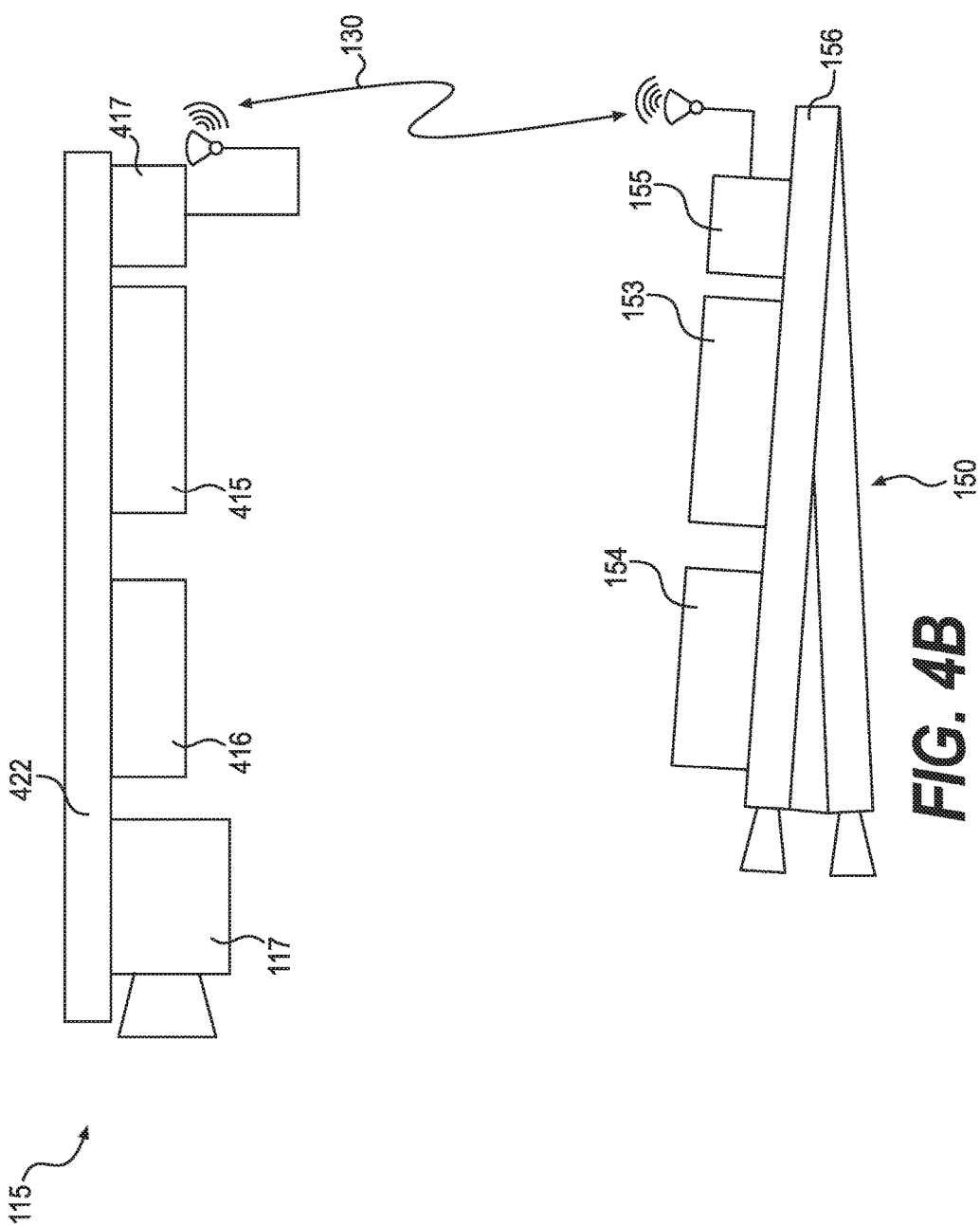

SYSTEMS AND METHODS FOR RELIABLE RELATIVE NAVIGATION AND AUTONOMOUS FOLLOWING BETWEEN UNMANNED AERIAL VEHICLE AND A TARGET OBJECT

CROSS-REFERENCE TO RELATED APPLICATION

The present disclosure is a continuation of U.S. patent application Ser. No. 14/559,365, filed on Dec. 3, 2014, and entitled "SYSTEMS AND METHODS FOR RELIABLE RELATIVE NAVIGATION AND AUTONOMOUS FOLLOWING BETWEEN UNMANNED AERIAL VEHICLE AND A TARGET OBJECT," the entire contents of which are herein incorporated by reference as if fully set forth in this description. Applicant notes that FIGS. 1A, 1B, 1C, and 3 have been changed in this continuation to illustrate the mobile target as a vehicle, which Applicant submits is supported by the parent application as filed.

TECHNICAL FIELD

The present disclosure relates generally to unmanned aerial vehicles and, more particularly, to systems and methods for effectively and accurately navigating an unmanned aerial vehicle relative to a stationary or mobile target.

BACKGROUND

In manner very similar to how smartphones revolutionized personal computing, unmanned aerial vehicles ("UAVs") are poised to change our civilian society in ways that have yet to be imagined. While it is too early to predict all of the areas of life in which UAVs will have an impact, it appears all but certain that their widespread use is imminent.

One of the key technologies enabling autonomous (as opposed to piloted) use of UAVs is positioning and control. Conventionally, UAV designers have put emphasis on absolute positioning (the specific location or position of the UAV in a coordinate space), since it has generally been thought of as being instrumental to the success of the mid- to high-altitude intelligence, surveillance, and reconnaissance ("ISR") missions where UAVs have typically been used by the military (the primary user of UAVs to date). With the proliferation of low-flying portable UAVs (e.g. multi-rotors), however, reliable relative positioning, independent of GPS, is crucial. This will enable UAVs to safely operate in close proximity to and relative to other (mobile) humans and machines, for both military and civilian applications.

The past five years have seen an explosion in consumer "drones", with some as inexpensive as $300. As this technology matures (e.g., in terms of endurance for VTOL multi-copters), prices continue to decrease, and the regulatory environment opens their wider use, various types of UAVs will find numerous consumer, commercial, and governmental applications. Indeed, the use of personal UAVs—those that can be operated by a single user and function with a level of autonomy that enables their user to carry on his various tasks without having to dedicate much attention to the vehicle operation—are expected to increase dramatically in the coming years. Personal UAVs can be thought of as physical extensions of the user, and as such tightly follow their user motion—just as arms and legs move with the rest of one's body.

To ensure their widespread adoption, personal UAVs generally cannot require their user to become skilled remote control pilots. In addition, they should operate as autonomously as possible, in order to free the user to focus on the specific activity, instead of worrying about operating the UAV.

Before such personal UAVs can become a reality, therefore, they should generally be able to reliably and accurately follow their user regardless of the user's dynamics and regardless of the environment (GPS/no GPS, indoor/outdoor, open/urban, line-of-sight/non-line-of-sight) and of obstacles. The user can be a person (walking, running, biking, skiing, racing, etc.), an animal (military/search-and-rescue dog), another vehicle (a car, a truck, a piloted UAV, an unmanned UAV), or a stationary reference (landing pad or navigation beacon).

UAV positioning and control technologies have so far focused on performing these tasks in the absolute frame, i.e., with respect to global Earth coordinates. Exceptions do exist, especially for launch and recovery operations, but in such cases the technology used is either not suitable to mobile applications (e.g. landing radar) or the requirement it places on GPS availability makes it unsuitable to most urban and indoor applications. Developing such technology for personal UAVs independently of the availability of GPS will be the focus of our work.

The presently disclosed relative navigation system addresses many of the problems and issues set forth above, thereby enabling UAVs to be operated by personnel without piloting skill. As such, the presently disclosed system allows operators to simply designate where the UAV is to be positioned at all times by either embedding target device electronics in the object of interest, or by designating the desired location using a collimated light source. In addition, the presently disclosed system enables the UAV to automatically detect and avoid obstacles located within its path. Accordingly, the presently disclosed systems and methods for effectively and accurately navigating an unmanned aerial vehicle relative to a mobile target are directed to overcoming one or more of the problems set forth above and/or other problems in the art.

SUMMARY

A system providing reliable, high-accuracy relative navigation for small UAVs is desirable. Systems and methods associated with the presently-disclosed embodiments enable small UAVs to autonomously follow mobile users at close range, regardless of the operating and environmental conditions (urban, mountainous, day/night/weather, GPS (un-) availability, LOS/NLOS). Systems and methods consistent with the disclosed embodiments take advantage of the mobility of the UAV, multiple sensors, and advanced fusion and control algorithms to accurately resolve and control the position of the UAV relative to the user. Additionally, the system leverages its collaborative relationship with the user to provide a reliable approach to obstacle avoidance that is suitable for small UAVs. This system is platform-agnostic and will be suitable to most small UAS currently available.

According to one embodiment, the UAV system generally consists of a so-called Airborne Device (AD), located onboard the UAV, which contains a variety of sensors and processes their information in our navigation software. The AD can also leverage information from an optional target device, containing a suite of sensors and a data link to the AD. The target device is not required for the AD to provide a full relative navigation solution. However including the target device makes the system more robust to user motion and to other environmental disturbances, virtually guaranteeing the accuracy of the relative navigation solution regardless of the operating scenario.

The presently disclosed system provides the following key attributes to any small UAV: (A) autonomy: Requires little to no user input, so the user can focus on his task ("launch and forget"); and (B) availability: 1) Can be deployed and recovered automatically anywhere, even from moving vehicles, and 2) Functions in harsh operational environments (no GPS, indoor, day/night, etc.) for uninterrupted support to ground personnel in the real-world; (C) safety and reliability: it will avoid people/structures and can be trusted to work every time The presently disclosed systems and methods address the navigation, guidance and control challenges by leveraging the collaborative and "following" nature of this application. The collaborative relationship between the UAV and its user implies that the UAV has access to both configuration and real-time information about the user. This data is leveraged in multi-sensor/multi-platform fusion algorithms that make our system robust to both aggressive relative motion and environmental disturbances.

The "following" relationship is in turn leveraged for intelligent path planning and obstacle avoidance. The key observation is that as the ground user traverses the environment he naturally detects and avoids obstacles, thereby defining an obstacle-free trajectory that can be used by the UAV when it detects obstacles on its path. This greatly simplifies the path planning task and removes the need for large-scale environment sensing and map-building, which is one of the most challenging aspect to this problem for small UAVs.

According to one aspect, the present disclosure is directed to a method for navigating an airborne device relative to a target. The method may comprise detecting, at an optical detector on the airborne device, an optical signal generated by an LED on the target. The method also comprises comparing, by a processor on the airborne device, the detected optical signal with a previously-detected optical signal. The method further comprises determining, by the processor based on the comparison, a change in location of at least one of the airborne device or the target. The method also comprises adjusting a position of the airborne device based on the determined change in location. The method also comprises predicting, by the processor, a movement of the target based on information indicative of at least one of a position, an orientation, an acceleration, a velocity, or an altitude of the target, wherein the position of the airborne device is adjusted based on the predicted movement of the target.

In accordance with another aspect, the present disclosure is directed to a system for aerial monitoring of a target. The system comprises a target device coupled to a target, wherein the target device comprises at least one LED configured to generate an optical signal. The system also comprises an airborne device coupled to an airborne vehicle and in data communication with the target device. The airborne device comprises an optical detector configured to detect the optical signal generated by the target device, and a processor communicatively coupled to the optical detector. The processor may be configured to compare the detected optical signal with a previously-detected optical signal, determine a change in location of at least one of the airborne device or the target, and generate a control signal for adjusting a position of the airborne device based, at least in part, on the determined change in location.

In accordance with another aspect, the present disclosure is directed to a method for aerial tracking of a target. The method may comprise detecting, at an optical detector associated with the airborne device, an optical signal pattern generated by a plurality of LEDs associated with the target. The method may also comprise comparing, by a processor associated with the airborne device, the detected pattern with a previously-detected optical pattern and with a baseline pattern. The method may further comprise determining, by the processor based on the comparison, a change in location of at least one of the airborne device or the target. The method may also comprise receiving, at the processor associated with the airborne device from at least one sensor located on-board the target, information indicative of at least one of a position, a rotation, an orientation, an acceleration, a velocity, or an altitude associated with the target. The method may also comprise predicting, by the processor associated with the airborne device based on the received information, a future movement of the target, and adjusting a position of the airborne device based, at least in part, on the determined change in location and the predicted movement of the target.

According to certain exemplary embodiments, the presently disclosed systems and methods provide a solution wherein the airborne device further comprises a proximity/range sensor and the optical detector includes an image sensor associated with a digital camera. The airborne device may be configured to detect an obstacle in a flight path associated with the airborne device based on obstacle information detected by the proximity/range sensor and the optical detector, and adjusting a position of the airborne device is further based, at least in part, on the obstacle information.

Alternatively or additionally to the above-described "machine vision" approach to obstacle detection/avoidance, the systems and methods described herein may leverage the collaborative (through bi-directional communication) and "following" nature of this application. The key observation is that as the target traverses the environment, it naturally detects and avoids obstacles, thereby defining an obstacle-free trajectory that can be leveraged by the UAV. When the UAV detects obstacles ahead, it gets onto the user-defined (obstacle-free) path. It then closely follows behind the user until the obstacles disappear and it can safely return to its nominal perch position behind the user. The processor associated with the airborne device 115 incorporates this capability to detect obstacles and avoid them by following the user-defined path until obstacles disappear.

BRIEF DESCRIPTION OF THE DRAWINGS

FIG. 4B provides a block diagram of an exemplary components associated with an alternative system for navigating an unmanned aerial vehicle relative to a mobile target, in accordance with certain disclosed embodiments;

DETAILED DESCRIPTION

Systems and methods consistent with the disclosed embodiments are directed to solutions for tracking of a target object (whether mobile or stationary) by an airborne device, such as an unmanned aerial vehicle (UAV). More particularly, the processes and features disclosed herein provide a solution for allowing the airborne device to accurately and reliably follow a target device, while maintaining a generally constant relative distance from the target device and avoiding obstacles in the path of the airborne device. Exemplary features associated with the presently disclosed system include path prediction and collision avoidance schemes for adjusting the flight path of the airborne device during tracking of the target. One or more camera devices mounted on the airborne device are used for tracking of the target, as well as recording video of the target for various uses, such as security; intelligence, surveillance, and reconnaissance (ISR) activities, aerial search and recovery, and recreational use, all autonomously, without requiring specific user piloting activities.

Figure 1A:
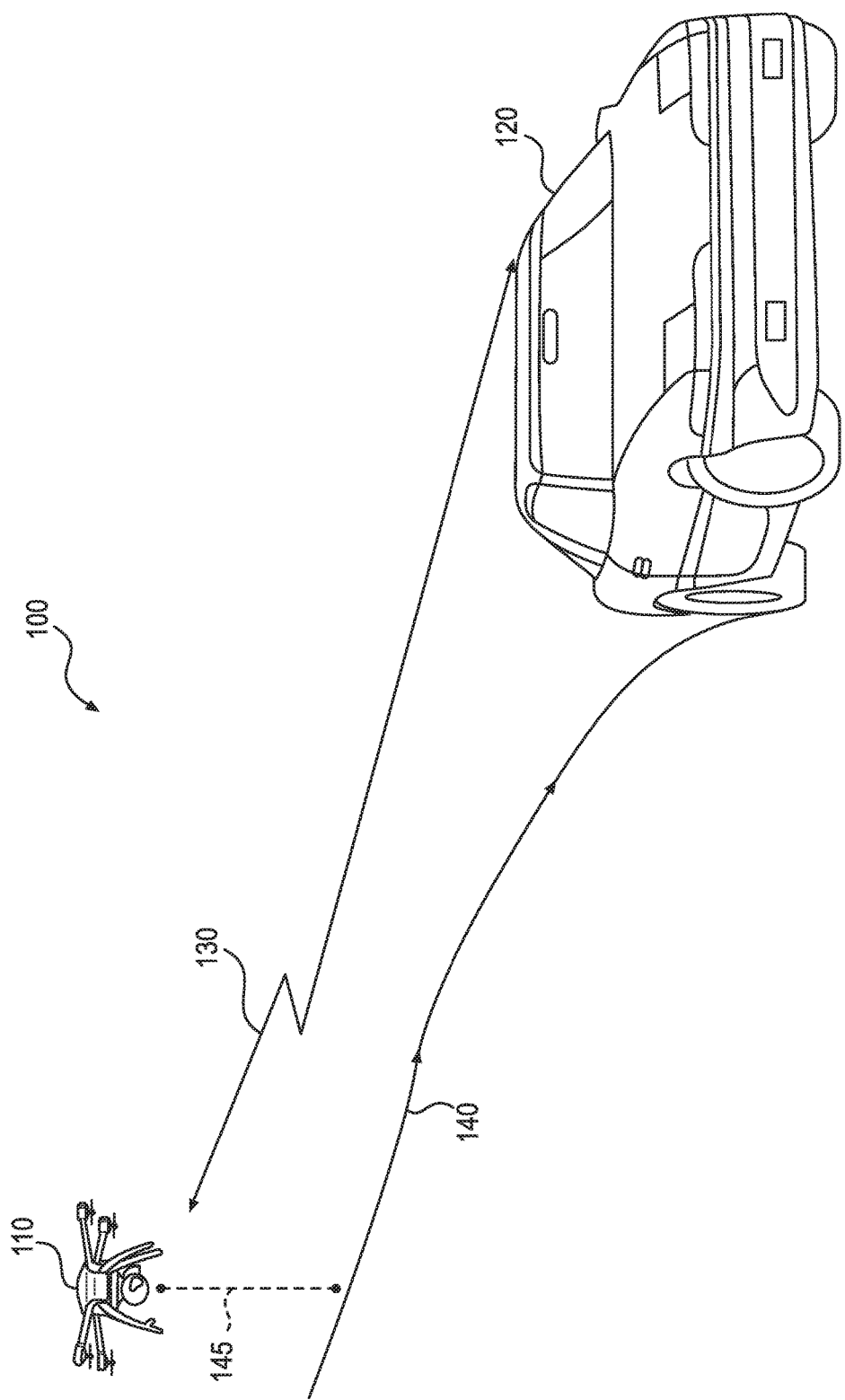
FIG. 1A illustrates one exemplary operation environment including a UAV and a mobile target, in which the presently disclosed systems and methods for effectively and accurately navigating the UAV relative to the mobile target may be implemented, consistent with certain disclosed embodiments.
Figure 1B:
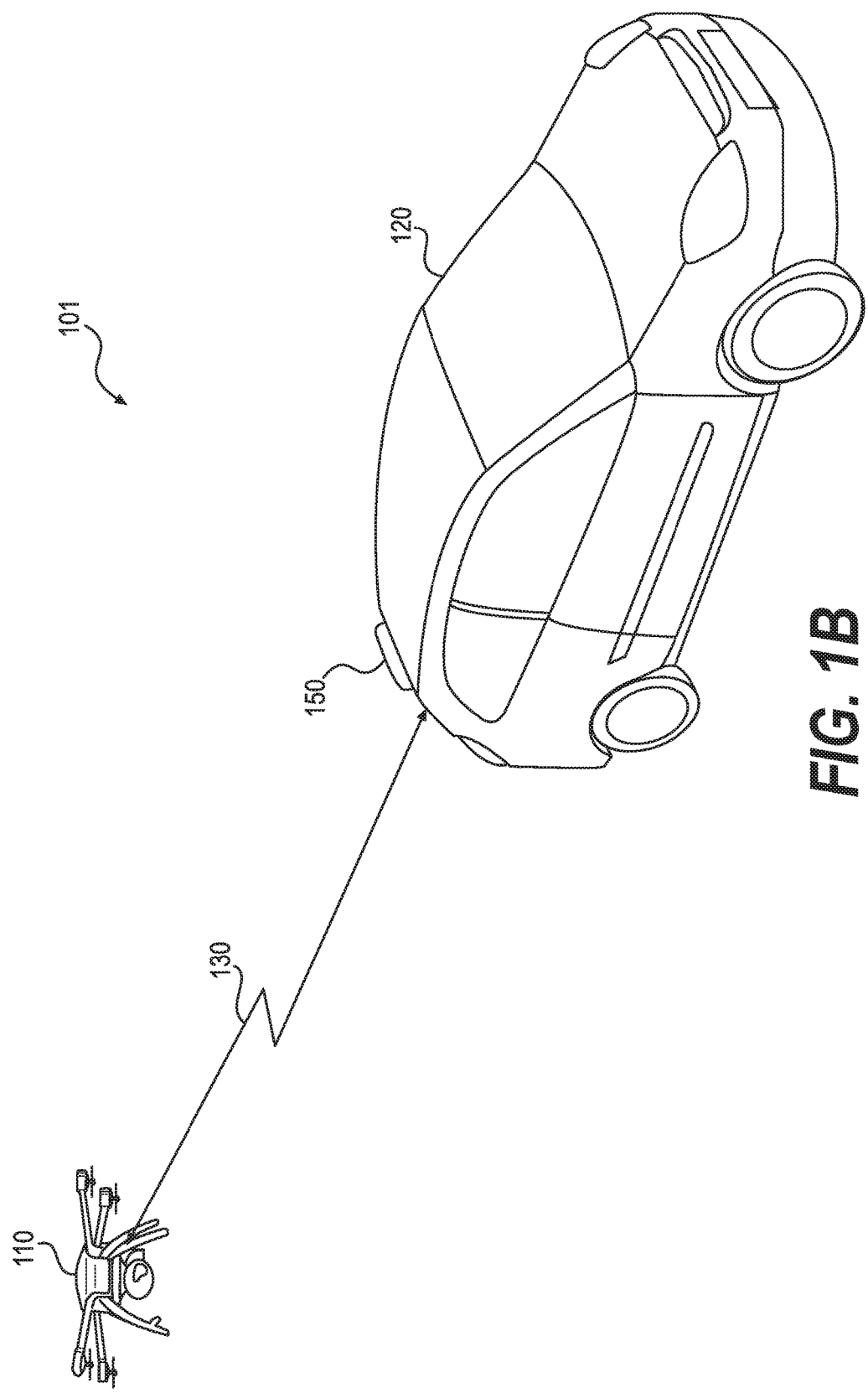
FIG. 1B illustrates another exemplary operation environment including a UAV and a mobile target, in which the presently disclosed systems and methods for effectively and accurately navigating the UAV relative to the mobile target may be implemented, in accordance with certain disclosed embodiments.
Figure 1C:
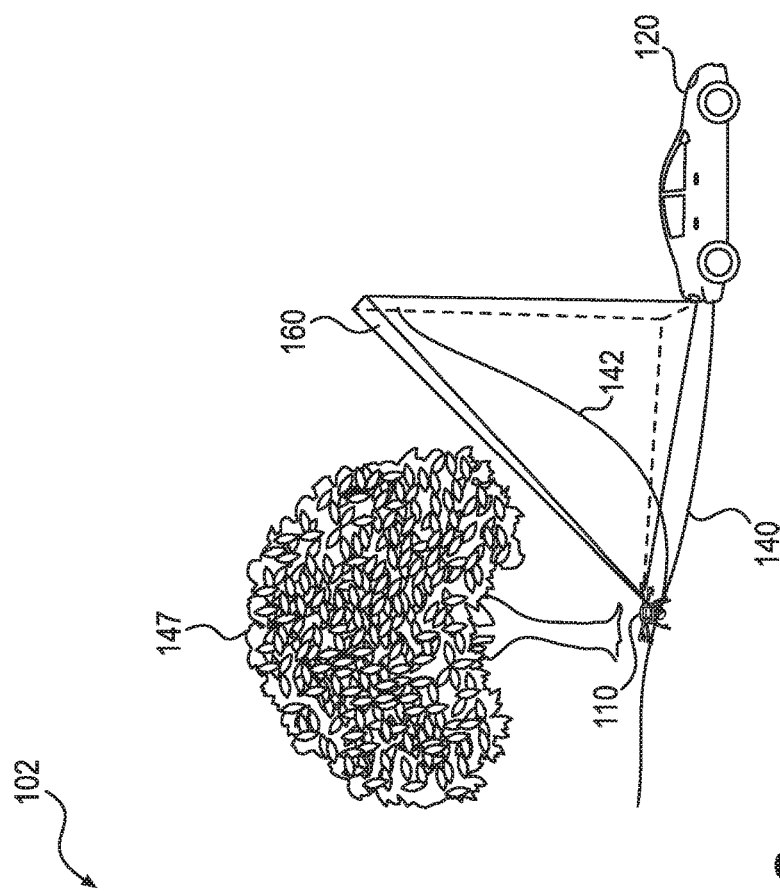
FIG. 1C illustrates yet another exemplary operation environment including a UAV and a mobile target, in which the presently disclosed systems and methods for effectively and accurately navigating the UAV relative to the mobile target may be implemented, consistent with certain disclosed embodiments.
Figure 1C:
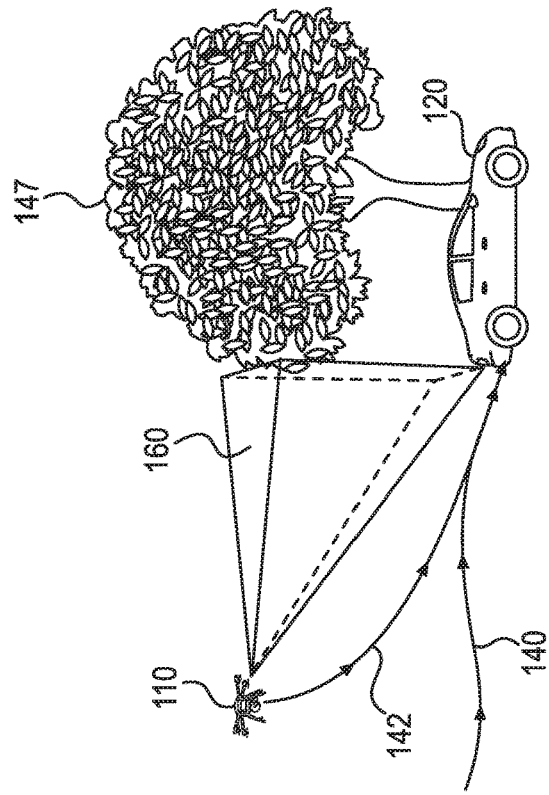

FIGS. 1A-1C illustrate exemplary operational environments 100, 101, and 102, respectively, in which the presently disclosed systems and methods for effectively and accurately navigating an unmanned aerial vehicle relative to a mobile target may be implemented. As illustrated in each of FIGS. 1A-1C, according to exemplary embodiments, the operational environment 100, 101, 102 may include an airborne vehicle 110, such as an unmanned aerial vehicle (UAV) and one or more stationary or mobile target objects 120. In certain embodiments, airborne vehicle 110 may be communicatively coupled via a data link 130 to one or more electronic components or target devices (shown as reference number 150 of FIG. 1B) that may be mounted or otherwise coupled to target 120. As illustrated in FIG. 1 and as will be explained in greater detail in connection with the figures and flowcharts that follow, airborne vehicle 110 may be configured to track target 120 from an aerial flight position 145 along a flight path 140.

The presently disclosed system is designed to be integrated into existing UAVs in order to transform them into personal UAVs that are smarter and more autonomous. As illustrated in FIG. 1B, the system generally comprises two parts, an airborne device (AD) and a target or user device 150. The AD (illustrated as reference numeral 115 of FIG. 2) is mounted on airborne vehicle 110 in a location that enables it to have an unobstructed view of target 120. The target device 150 is mounted on the target 120 and is connected to a set of LEDs (typically near-infrared (NIR), but other wavelengths of optical or thermal signals are contemplated) distributed on the target 120.

In certain operational environments, the system may be configured with path planning and obstacle detection/avoidance technology. Such an embodiment is illustrated in FIG. 1C. As illustrated in FIG. 1C and as will be explained in greater detail below, the airborne vehicle may be equipped with proximity, machine vision, and image analysis hardware and software that is configured to cooperate to monitor an optical pathway 160 ahead of airborne vehicle 110 as the airborne vehicle follows target 120 along flight path 140. Upon detection of an obstacle 147 in the optical pathway, airborne device 115 may be configured to change the flight position 145 to define an alternate flight position 142 in order to avoid obstacle 147.

In some situations, such a deviation may result in a temporary deviation of the general plan to maintain the relative range and trajectory between airborne vehicle 110 and target 120. As illustrated in FIG. 1C, for example, once airborne device 115 determines that the path ahead contains obstacles, airborne device 115 may be configured to change the flight position 145 to redefine the flight position 142 to follow its user from directly behind, since the user defines an obstacle-free path. Once airborne device 115 determines that the optical patch 160 is clear, airborne device 115 may be configured to change the flight position 145 to redefine the flight position 142 to restore the relative range and trajectory between airborne vehicle 110 and target 120 to its default relative navigation settings over flight path 140.

Figure 2:
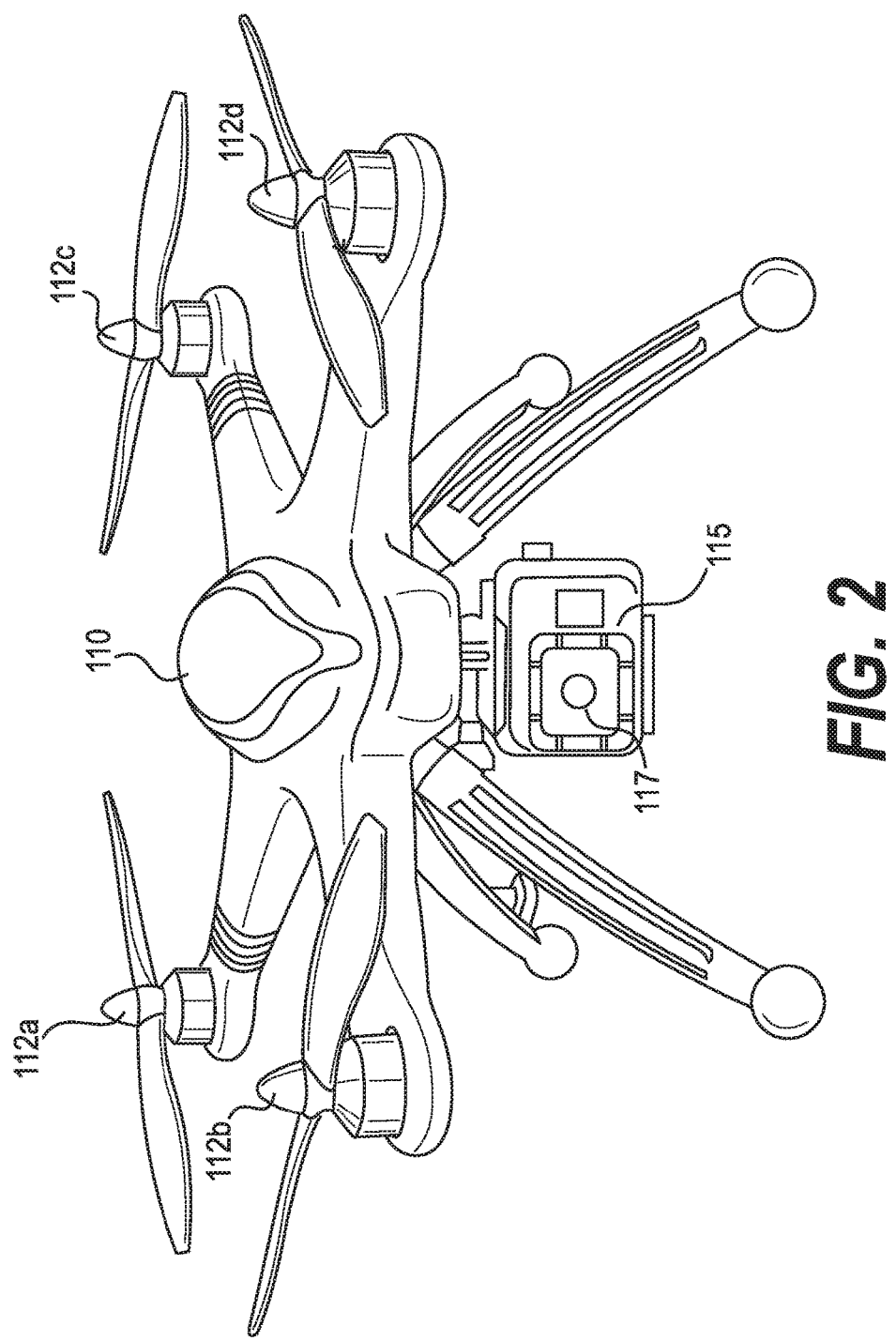
FIG. 2 illustrates an exemplary airborne device (AD), such as an unmanned aerial vehicle (UAV), in accordance with certain disclosed embodiments.

FIG. 2 illustrates a multi-rotor aerial vehicle 110 (e.g., a UAV), in accordance with certain disclosed embodiments. As illustrated in FIG. 2, the UAV may comprise one or more electrical components adapted to control various aspects of the operation of the UAV, which may be disposed inside a housing or cavity associated with the airborne device 115 or mounted to the airborne device 115, such as on the underside of the device. Such electrical components can include an energy source (e.g., battery), flight control or navigation module, GPS module (e.g., GPS receivers or transceivers), inertial measurement unit (IMU) module, communication module (e.g., wireless transceiver), electronic speed control (ESC) module adapted to control an actuator (e.g., electric motor), actuator(s) such as an electric motor used to actuate a rotor blade or rotor wing of the UAV, electrical wirings and connectors, and the like. In some embodiments, some of the electrical components may be located on an integrated electrical unit such as a circuit board or module. One or more electrical units may be positioned inside the housing of the airborne vehicle 110. When in use, the electrical components discussed herein may cause interference (e.g., electromagnetic interference) to other components (e.g., magnetometer) of the UAV. In some embodiments, the interference may be caused by ferrous material or static sources of magnetism. For example, the electrical components may comprise magnets that generate magnetic fields, thereby causing magnetic interference.

As illustrated by FIG. 2, the body portion of the UAV comprises a central housing member and one or more branch housing members. The inner surface of the central housing member can form a central cavity. Each of the branch housing members, in the shape of a hollow arm or any other suitable shape, can form a branch cavity. When the central housing member is connected to the one or more branch housing members, the central cavity and the one or more branch cavities can collectively form one unified cavity.

The branch housing members can be connected to the central housing member in an "X" or star shaped arrangement. Specifically, the central housing member can be located at the center of the X or star shaped arrangement whereas the branch housing members can be distributed around the central housing member, in a symmetric or asymmetric fashion. In some embodiments, such a star-shaped arrangement can facilitate efficient electrical connection between electrical components disposed within the cavity of the housing, such as between a centrally located flight control module and the individual ESC modules located in respective branch cavities. Or between a centrally located energy source (e.g., battery) and actuators (e.g., electric motors) used to drive the rotors of a multi-rotor UAV. In other embodiments, the housing and/or the cavity inside the housing of the UAV may have a shape other than the star shape described herein. For example, the housing and/or the cavity inside the housing can form a substantially spherical, elliptical, or cylindrical shape or any other shape.

In a typical embodiment, the number of branch housing members is equal to the number of rotors or actuator assemblies of the UAV. An actuator assembly (not shown) can include a rotor wing or rotor blade 112a-112d and an actuator that is used to actuate the rotor blade 112a-112d. For example, a four-rotor quadcopter such as illustrated in FIG. 2 may have four branch housing members, each corresponding to one of the four rotors or actuator assemblies. In the illustrated embodiment, the UAV has four branches, each corresponding to one actuator assembly. That is, the UAV has four actuator assemblies. In various embodiments, the number of the branches and/or the arrangement thereof may be different from those illustrated herein. For example, in some embodiments, there may be more or less branch housing members and/or rotors or actuator assemblies than illustrated here. For example, a 6-rotor UAV may have six rotors or actuator assemblies and six corresponding branch housing members. An 8-rotor UAV may have eight rotors or actuator assemblies and eight corresponding housing members. In alternative embodiments, the number of branch housing members may not correspond to the number of rotors or actuator assemblies of the UAV. For example, there may be more or less branch housing members than actuator assemblies. In various embodiments, the numbers of branches, actuator assemblies, and actuators can be adjusted according requirements of actual circumstances. To ensure stability of the UAV during operation, a typical multi-rotor UAV has no less than three rotors.

In various embodiments, the one or more electrical components may be adapted to control various aspects of the operation of the UAV. Such electrical components can include an energy source (e.g., battery), flight control or navigation module, GPS module (e.g., GPS receivers or transceivers), inertial measurement unit (IMU) module, communication module (e.g., wireless transceiver), electronic speed control (ESC) module adapted to control an actuator (e.g., electric motor), actuator such as an electric motor that is used to actuate a rotor blade or rotor wing of the UAV, connecting members configured to electrically connect the electrical components (such as electrical wirings and connectors), and the like. In various embodiments, some or all of the electrical components of the UAV may be located inside the housing.

Figure 4A:
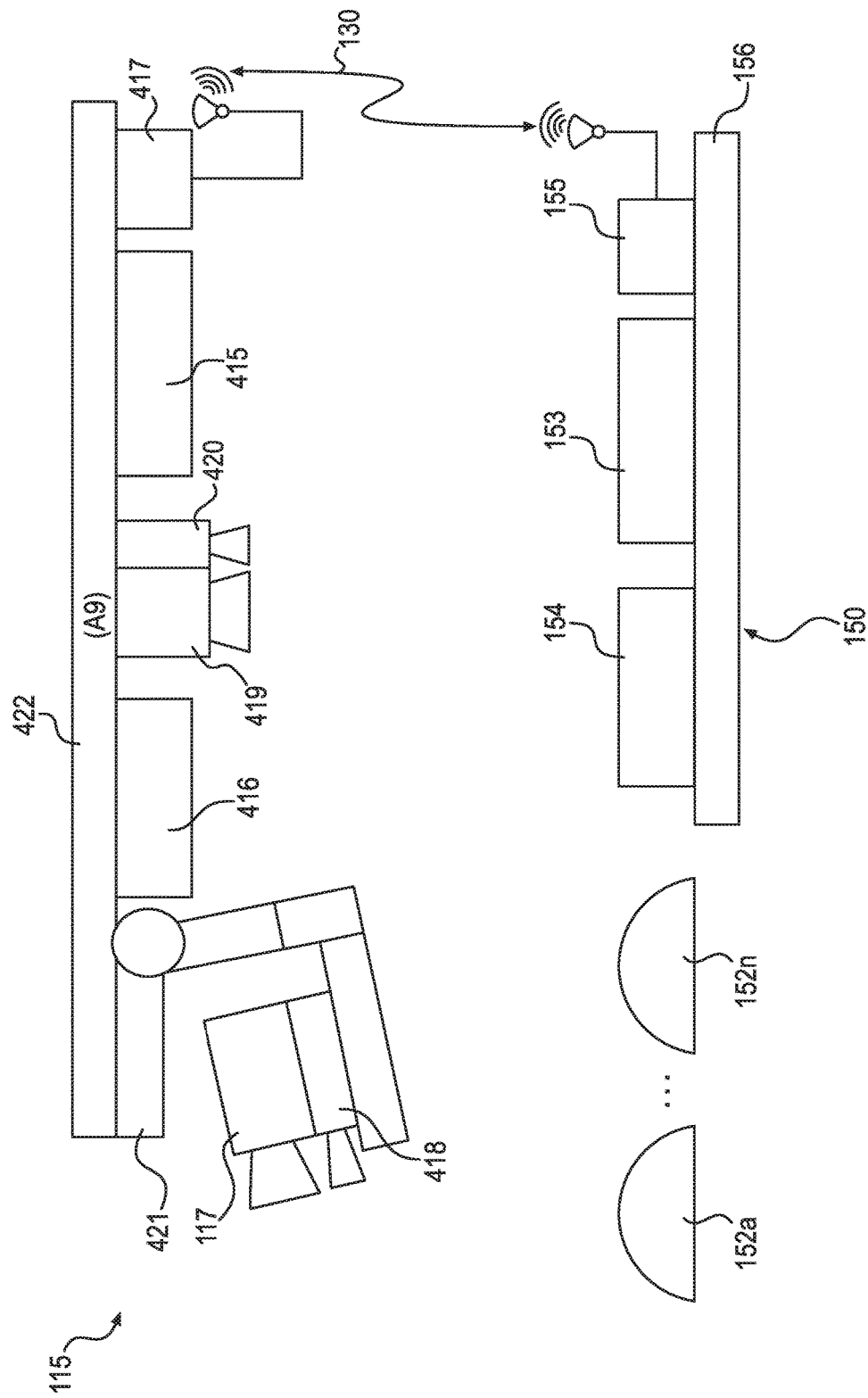
FIG. 4A provides a block diagram of exemplary components associated with a system for navigating an unmanned aerial vehicle relative to a mobile target, in accordance with certain disclosed embodiments.

In some embodiments, some of the electrical components discussed above may be located on one or more circuit modules. Each circuit module can include one or more electrical components. For example, as shown in FIGS. 4A and 4B, the circuit module can include the main flight control module that includes one or more processors (such as implemented by a field-programmable gate array (FPGA)) for controlling key operations of the UAV. As another example, the same or a different circuit module can also include an IMU module for measuring the UAV's rotational rate, and acceleration. The IMU module can include one or more accelerometers and/or gyroscopes. As another example, the same or a different circuit module can also include a communication module for remotely communicating with a target device. For example, the communication module can include a wireless (e.g., radio) transceiver.

The flight control module or processor is typically a key component or "brain" of an UAV. For example, the flight control module can be configured to estimate the current velocity, orientation and/or position of the UAV based on data obtained from visual sensors (e.g., cameras), IMU, GPS receiver and/or other sensors, perform path planning, provide control signals to actuators to implement navigational control, and the like. As another example, the flight control module can be configured to issue control signals to adjust the state of the UAV based on remotely received control signals.

In some embodiments, the electrical components can include one or more electronic speed control (ESC) modules. An ESC module can be adapted to control the operation of an actuator. The actuator can be part of an actuator assembly and configured to actuator a rotor blade or wing of the UAV. In some embodiments, the ESC module can be electrically connected to the flight control module on the one hand, and an actuator on the other hand. The flight control module can provide control signals for the ESC module, which in turn provides actuator signals to the electrically connected actuator so as to actuate the corresponding rotor blade. In some embodiments, feedback signals can also be provided by the actuator and/or the ESC module to the flight control module.

In some embodiments, the UAV also includes one or more connecting members for electrically coupling or connecting the various electrical components of the UAV. Such connecting members can include electrical wires, cables, and the like that are used for transmitting power, data or control signals between the components. For example, the connecting members can be used to electrically connect 1) an energy source and an actuator assembly; 2) a circuit module and an ESC module; 3) an ESC module and an actuator; 4) a communication module and a circuit module, or the like. In some embodiments, the connecting members have pluggable connectors at the distal portions to facilitate plugging and unplugging of the connecting members with respect to the electrical components.

In some embodiments, some or all of the electrical components discussed above are pre-configured, pre-assembled or pre-connected by a manufacturer of the UAV. In such embodiments, no or very little user assembly and/or calibrate may be required for the UAV to operate, making the UAV "ready-to-fly" out-of-the-box. Such pre-configuration of components not only enhances the user experience by lowering the technical expertise required, but also reduces the errors or accidents caused by user mis-configuration. In some embodiments, such pre-configured or pre-assembled components can include the flight control module, GPS receiver, ESC module, or any of the electrical components discussed herein, or any combination thereof. In some embodiments, one or more electrical components may be pre-configured, pre-connected or pre-assembled as an electrical unit (e.g., a circuit module). The electrical unit may be necessary and sufficient for controlling operation of the UAV. In some embodiments, no additional user configuration is required for the pre-configured components to operate properly out-of-the-box. In other embodiments, some amount of user configuration or assembly may be required. In other situations, the user may define certain parameters, such as flight height and range between the airborne vehicle 110 and target 120 from a plurality of pre-selected parameters.

Figure 3:
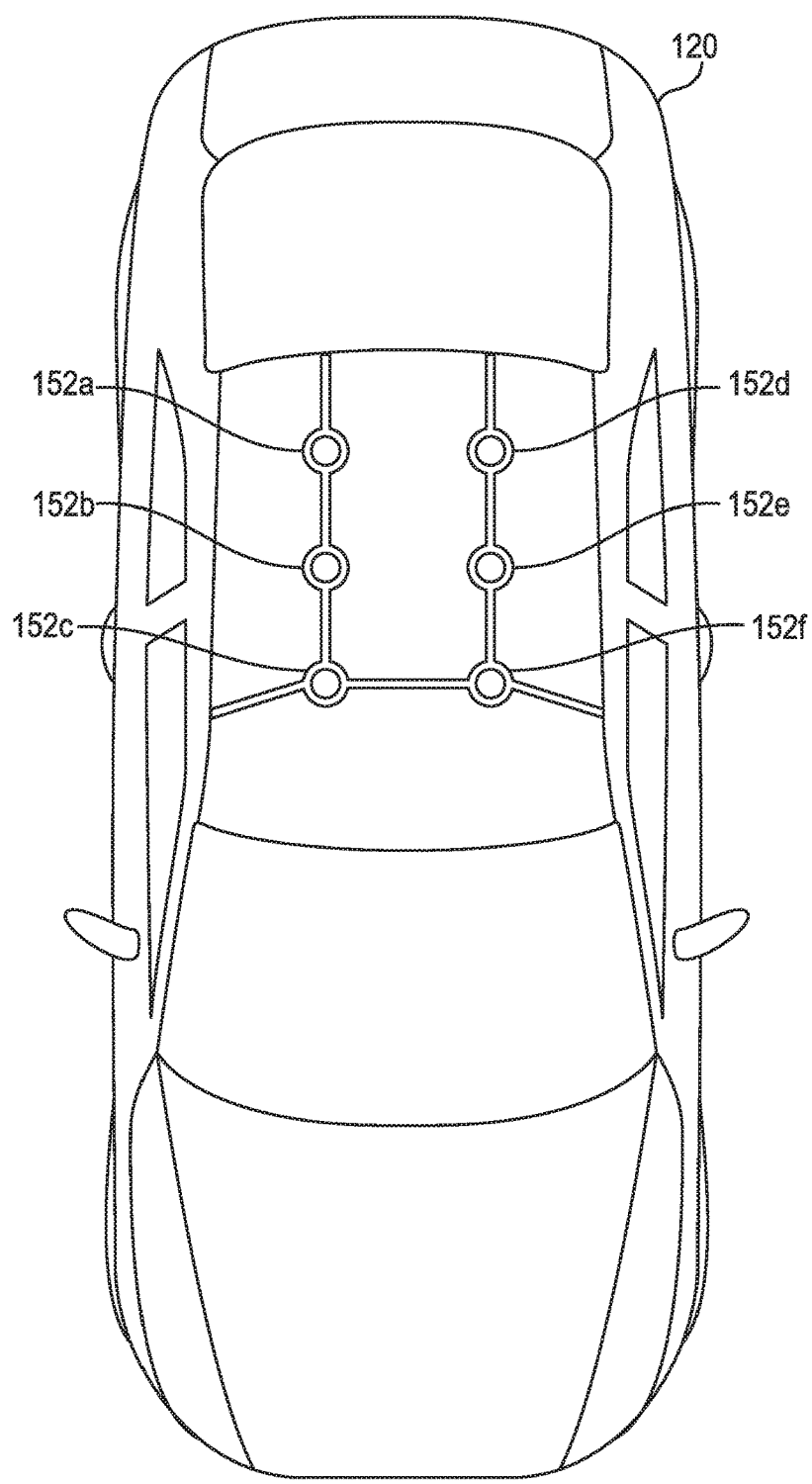
FIG. 3 illustrates an exemplary mobile target having at least one optional target device, consistent with certain disclosed embodiments.

FIG. 3 illustrates an exemplary embodiment of a target device 120 that may be mounted or attached to a mobile target, such as a person. The primary external feature of the target device are the one or more LEDs used to generate optical signals or pulses that are detectable by airborne device 115 mounted on airborne vehicle 110. As illustrated in FIG. 3, LEDs may be arranged in a predetermined spatial pattern that, when compared to a previously-detected pattern and/or a default calibration pattern, may be used, at least partially, in the estimation of the relative state vector by the airborne device in order to determine the relative position, velocity, and orientation between airborne device 115 and target 120. As an alternative or in addition to spatial pattern, the one or more LEDs may be configured to flash according to a frequency or pattern that is either known a priori or communicated in real-time to the airborne device. This flashing pattern may be detected by one or more monochrome cameras located on-board the airborne device. A processor located on the airborne device may be configured to use the flash pattern to correlate images captured at different times in order to robustly extract the location of the LEDs in each image. The images captured at different times may be compensated for motion. The change in LED location from image to image may then be used, at least partially, in the estimation of the relative state vector by the airborne device in order to determine the relative position, velocity, and orientation between airborne device 115 and target 120.

System Configuration

FIG. 4A illustrates an exemplary embodiment of sensor suite that is used in the presently disclosed systems for effectively and accurately navigating an unmanned aerial vehicle relative to a mobile target. As explained, estimating the relative state is required so that the airborne vehicle 110 knows at all times where it is relative to the target 120 it intends to follow. This state is used in the flight control laws that drive control actuators to ensure the airborne vehicle 110 follows the prescribed path. Because the target 120 may have very dynamic motion, it is important that the entire relative state be used for control (not just relative position, but also relative velocity and acceleration). This is enabled by collaboration, with the target device 150 sending its inertial information to the airborne device 115.

In order to make use of the information associated with the target 120, however, accurate knowledge of relative heading is required. If relative heading is unknown, the acceleration measured by the target device 150 cannot be related to airborne device 115 axes and the airborne device 115 therefore cannot use it to provide key lead velocity and acceleration information to the control system. This would degrade the ability of the airborne vehicle 110 to accurately track a given trajectory. Accurate knowledge of relative heading enables the airborne vehicle 110 to follow the user under a much greater range of motion. The sensor suite was therefore selected in order to maximize observability into the entire relative state, whether or not GPS is present.

According to the embodiment illustrated in FIG. 4A, both the airborne device 115 and target device 150 have one or more inertial measurement units (IMUs), static pressure sensors, tri-axial magnetometers, and/or GPS transceivers. Each of these one or more sensors—referred to herein as the "core" sensors—are contained within respective sensor modules 416 and 154 with are mounted on respective mounting plates 422 and 156 of respective airborne device 115 and target device 150.

According to one embodiment, the IMU may include or embody any electronic device that is configured to measure and report rotational rates and accelerations. IMU may include a combination of accelerometers and gyroscopes. According to one embodiment, inertial measurement unit(s) may contain a 3-axis gyroscope, a 3-axis accelerometer, and a 3-axis magnetometer. It is contemplated, however, that fewer of these devices with fewer axes can be used without departing from the scope of the present disclosure. For example, according to one embodiment, inertial measurement units may or may not include an on-board magnetometer. It may include only a 3-axis gyroscope and 3-axis accelerometer, the gyroscope for calculating the orientation based on the rate of rotation of the device, and the accelerometer for measuring earth's gravity and linear motion, the accelerometer providing corrections to the rate of rotation information (based on errors introduced into the gyroscope because of device movements that are not rotational or errors due to biases and drifts). In other words, the accelerometer may be used to correct the orientation information collected by the gyroscope. Similar the magnetometer can be utilized to measure the earth's magnetic field and can be utilized to further correct gyroscope errors. Thus, while all three of gyroscope, accelerometer, and magnetometer may be used, orientation measurements may be obtained using as few as one of these devices. The use of additional devices increases the resolution and accuracy of the orientation information and, therefore, may be advantageous when orientation accuracy is important.

Pressure sensor(s) may be a barometer or any other suitable device that can be used to determine changes in pressure, which, in turn, may be used to determine changes in altitude associated with the respective airborne device 115 or target device 150.

As illustrated in FIG. 4A, airborne device 115 may also include one or more monochrome cameras 117, 419, each of which is configured to detect an optical signal emitted by LEDs 152a-152n associated with target device 150. Airborne device 115 may also include one or more range sensors 418, 420 configured to detect the relative distance between the airborne device 115 and target device 150. As illustrated in FIG. 4A, one set of camera and range sensor is downward-facing and may be used to compute optical flow around the airborne device 115. The other set of camera and range sensor is mounted on a 3-D gimbal 421 and is used to track the LEDs 152a-152n associated with target device 150 and sense obstacles. Raw data from all sensors is provided to the AD processing module, where it is fused to estimate the relative state, detect obstacle, and compute guidance commands that are then sent to the autopilot (pitch, roll, yaw, thrust).

Airborne device 115 may be communicatively coupled to target device 150 and may be configured to receive, process, and/or analyze data measured by the target device 150. According to one embodiment, airborne device 115 may be wirelessly coupled to target device 150 via respective wireless communication transceiver(s) 417, 155 operating any suitable protocol for supporting wireless (e.g., wireless USB, ZigBee, Bluetooth, Wi-Fi, etc.)

Wireless communication transceiver(s) 417, 155 associated with airborne device 115 and target device 150, respectively, may include any device suitable for supporting wireless communication between one or more components of airborne device 115 and target device 150. As explained above, wireless communication transceiver(s) 417, 155 may be configured for operation according to any number of suitable protocols for supporting wireless, such as, for example, wireless USB, ZigBee, Bluetooth, Wi-Fi, or any other suitable wireless communication protocol or standard. According to one embodiment, wireless communication transceiver 417, 155 may embody a standalone communication module, separate from the respective processing systems. As such, wireless communication transceiver 417, 155 may be electrically coupled to the respective processing system of airborne device 115 or target device 150 via USB or other data communication link and configured to deliver data received therein to the corresponding processing system for further processing/analysis. According to other embodiments, wireless communication transceivers 417, 155 may embody an integrated wireless transceiver chipset, such as the Bluetooth, Wi-Fi, NFC, or 802.11x wireless chipset included as part of the respective processor of airborne device 115 or target device 150.

Processing hardware 415, 153 associated with airborne device 115 and target device 150, respectively, may each include or embody any suitable microprocessor-based device configured to process and/or analyze information collected by sensors associated with the respective system. According to one embodiment, processing system 415, 153 may each embody a general purpose computer programmed with software for receiving and processing, for example, position information associated with the corresponding component of the system. According to other embodiments, processing hardware 415, 153 may be a special-purpose computer or ASIC to perform specific processing tasks (e.g., ranging, path prediction, obstacle detection, or collision avoidance). Individual components of, and processes/methods performed by, processing hardware 415, 153 will be discussed in more detail below in connection with the explanation of the operational methods.

FIG. 4B illustrates a system configuration consistent with an alternate embodiment of the presently disclosed system for effectively and accurately navigating an unmanned aerial vehicle relative to a mobile target. This alternative embodiment may be used to follow a user-designated target. In this system, the component setup for the airborne device 115 is substantially similar to that described in FIG. 4A, and, therefore, will not be discussed in additional detail in connection with FIG. 4B. The configuration of the target device 150 differs in that, instead of LEDs, the target device 150 includes a plurality of lasers with range finding capabilities mounted on the mounting plate 156. During operation, the user points the lasers at the target of interest, which transmits the data back to the airborne device 115, which processes the data to determine the distance between the two projected points. The airborne device 115 uses the points and their relative spacing to infer range to the target. An IMU located on the target device provides information to predict the target motion and assist in tracking the laser spots.

Sensor Fusion

According to one embodiment, the only pre-processing performed on sensor data is on the images. Optical flow is extracted from the downward-looking camera so that body-axis velocities can be measured. Images from the tracking camera are processed in order to reliably extract the location of target device LEDs within the image. Furthermore, the collaborative nature facilitated by the bi-directional communication between the airborne device 115 and target device 150 makes this process robust to the various lighting conditions that the system will experience in the real-world.

According to one embodiment, the camera exposure setting may optimized based on the estimated distance and the known LED brightness, such that (1) motion blur is minimized while (2) disturbances from other sources in the NIR spectrum (sun, fire, glare, etc.) are minimized. The robustness of LED extraction is further augmented by leveraging the relative state estimate and reduce the size of the image processing and LED search region of interest (ROI), consistent with the state estimate uncertainty.

The camera exposure is synchronized with the known flashing pattern of the LEDs, such that frames are captured in rapid succession with LEDs on and off. The relative state information is used to re-project pixels from a set of images to a common time, such that images from the set can be added and subtracted based on the respective known LED state. This time-correlation process will eliminate disturbance illumination not in phase with the LED flashing pattern, enabling the extraction of LED location through blob detections.

According to one embodiment, the sensor data from both target device 150 and airborne device 115 is then fused within an extended Kalman filter (EKF) to estimate the relative state vector.

The sensor suite is adapted to enhance observability into every state whether or not GPS is present. States that are particularly challenging to estimate are relative distance and relative heading. Relative distance is challenging because the range sensor will not always be pointed directly to the user, since it will also be used to scan for obstacles. Heading is always a challenging state to estimate, which is amplified by the fact that the magnetometer cannot be used due to the large disturbances in the magnetic field experienced indoors and close to the ground. In this regard we note the following key features of our approach: Using multiple LEDs on the user enables camera updates to provide observability into relative distance, velocity, relative pitch, roll, and heading, and all relative inertial biases (provided the LEDs spatial distribution is adequate).

When the relative bias between the airborne device 115 and target device 150, static pressure sensors is estimated, these sensors provide observability into relative distance as long as the airborne device 115 is not at the same height as the target device 150 (range is intuitively observable when relative height and elevation angle are known). Relative motion of the airborne device 115 relative to the target device 150 (vertical or horizontal) provides observability into relative distance.

When GPS is present on both airborne device 115 and target device 150, most states are observable through GPS and the camera. When GPS is absent optical flow is necessary in order for the airborne device 115 X- and Y-axis accelerometer and gyro biases to be observable through body X- and Y-axis velocity updates. With these airborne device 115 biases known, the corresponding target device 150 biases are observed through bearing updates to different LEDs.

As explained above, the presently disclosed system may be configured to detect obstacles and provide guidance to avoid them. To reliably address the obstacle detection and avoidance challenge our system leverages the collaborative (through bi-directional communication) and "following" nature of this application. The key observation is that as the target traverses the environment, it naturally detects and avoids obstacles, thereby defining an obstacle-free trajectory that can be leveraged by the UAV. When the UAV detects obstacles ahead, it gets onto the user-defined (obstacle-free) path. It then closely follows behind the user until the obstacles disappear and it can safely return to its nominal perch position behind the user. The processor associated with the airborne device 115 incorporates this capability to detect obstacles and avoid them by following the user-defined path until obstacles disappear.

As illustrated in FIG. 1C, the perception required to detect obstacle during nominal flight can be constrained to a small volume of space driven by (1) vertically, the height difference between the airborne device 115 and target device 150; (2) laterally, a distance driven by size of the airborne device 115 and its ability to track lateral position; and (3) forward, a distance drive by the speed of the airborne device 115. A similar volume needs to be sensed in order to safely return to the perch position. This is illustrated in FIG. 1C.

Using this volumetric calculation scheme, reliably addressing the obstacle avoidance task then only requires one ranging sensor with limited range and scanning volume, something that can be accomplished with proximity and ranging sensors. According to one embodiment, the speed of the airborne vehicle 110 may be limited by the speed of the user, which will typically be under 5 m/sec for a dismounted user and 15 m/sec for off-road vehicles. Allowing a minimum time-to-collision of 3 sec requires obstacles to be detected up to about 60 m (allowing 1 sec to scan the entire volume). Such range is achievable with small laser rangefinders available today (e.g., PulsedLight Inc. LIDAR-Lite). By mounting this sensor on the pitch and yaw gimbal already hosting the camera, the necessary volume can be efficiently scanned, while also measuring the distance between airborne device 115 and target device 150.

Figure 5:
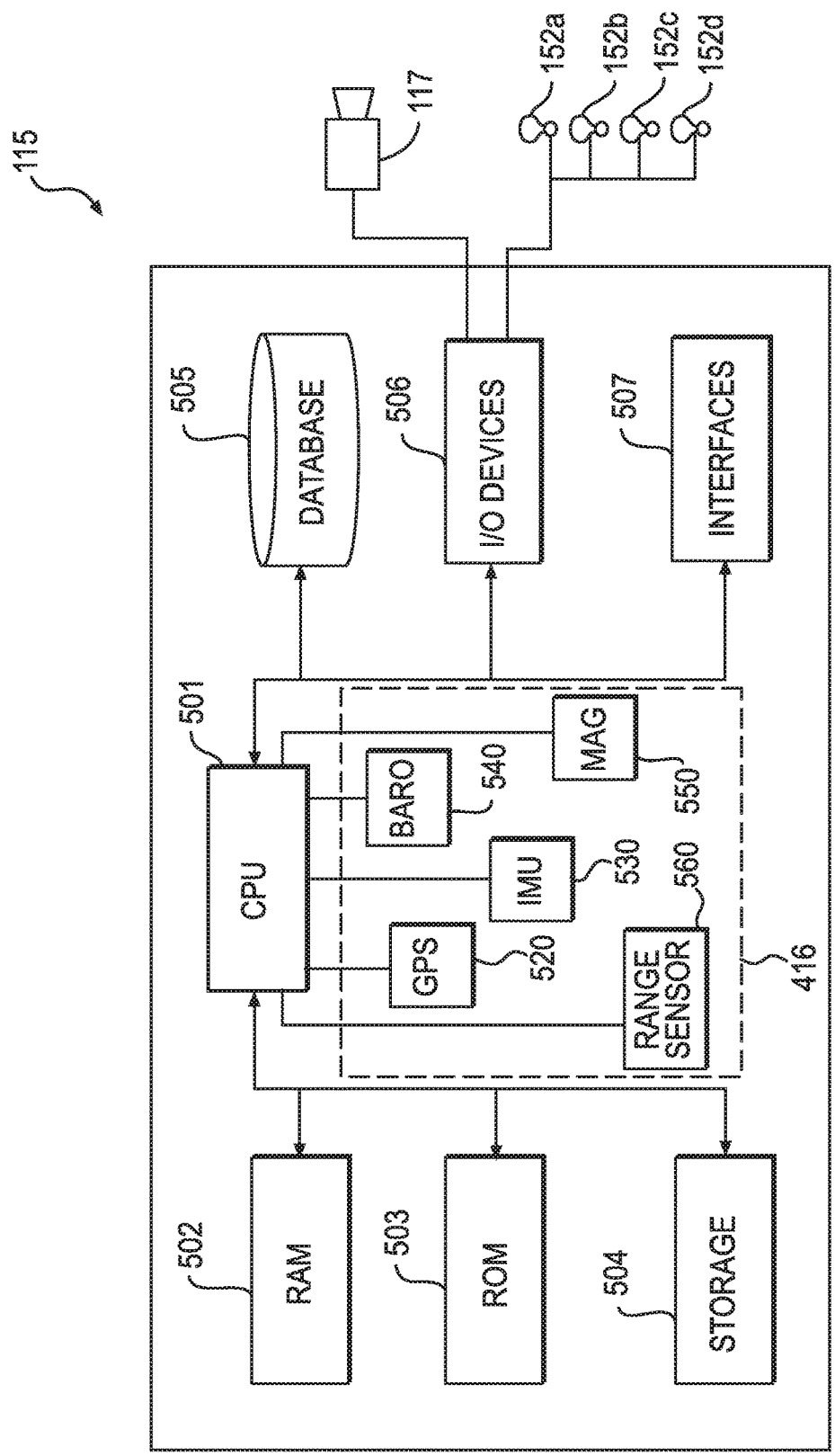
FIG. 5 illustrates a schematic diagram of a system in which the presently disclosed methods for navigating an unmanned aerial vehicle relative to a mobile target, consistent with certain disclosed embodiments.

FIG. 5 illustrates a schematic diagram of a processing system in which the presently disclosed methods for navigating an unmanned aerial vehicle relative to a mobile target, consistent with certain disclosed embodiments. This processing system may be included as part of airborne device 115 or target device 150, and may include additional and/or different computer components than those illustrated in FIG. 5. For example, database 505 and storage 504 may be omitted from the target device 150 in order to reduce size, weight, and cost of the device. Essentially, FIG. 5 serves to illustrate the exemplary (and optional) hardware that may be used in performing the data processing and analysis that is generally associated with the airborne device 115. It should be understood, however, that, given the collaborative nature of the system, some or all of these components may be included as part of target device 150, as well.

As explained, the processing system associated with airborne device 115 (and, optionally, target device 150) may be any processor-based computing system that is configured to receive sensor information from core sensor package 416, calculate the relative position of one or more of the airborne device 115 or target device 150, analyze the relative position information, and adjust the position of the airborne vehicle 110 in order to track the target 120 and maintain a relative distance between the airborne vehicle 110 and target 120. Non-limiting examples of such a processing system include a desktop or notebook computer, a tablet device, a smart-phone, wearable or handheld computers, ASIC, or any other suitable processor-based computing system. As illustrated in FIG. 5, core sensor package 416 includes GPS 520, IMU 530, barometer 540, magnetometer 550, and range sensor 560.

For example, as illustrated in FIG. 5, processing system may include one or more hardware and/or software components configured to execute software programs, such as range finding, collision avoidance, obstacle detection, path planning, just to name a few. According to one embodiment, processing system may include one or more hardware components such as, for example, a central processing unit (CPU) or microprocessor 501, a random access memory (RAM) module 502, a read-only memory (ROM) module 503, a memory or data storage module 504, a database 505, one or more input/output (I/O) devices 506, and an interface 507. Alternatively and/or additionally, processing system may include one or more software media components such as, for example, a computer-readable medium including computer-executable instructions for performing methods consistent with certain disclosed embodiments. It is contemplated that one or more of the hardware components listed above may be implemented using software. For example, storage 504 may include a software partition associated with one or more other hardware components of processing system. Processing system may include additional, fewer, and/or different components than those listed above. It is understood that the components listed above are exemplary only and not intended to be limiting.

CPU 501 may include one or more processors, each configured to execute instructions and process data to perform one or more functions associated with the processing system shown in FIG. 5. As illustrated in FIG. 5, CPU 501 may be communicatively coupled to RAM 502, ROM 503, storage 504, database 505, I/O devices 506, and interface 507. CPU 501 may be configured to execute sequences of computer program instructions to perform various processes, which will be described in detail below. The computer program instructions may be loaded into RAM 502 for execution by CPU 501.

RAM 502 and ROM 503 may each include one or more devices for storing information associated with an operation of processing system and/or CPU 501. For example, ROM 503 may include a memory device configured to access and store information associated with processing system, including information for identifying, initializing, and monitoring the operation of one or more components and subsystems of processing system. RAM 502 may include a memory device for storing data associated with one or more operations of CPU 501. For example, ROM 503 may load instructions into RAM 502 for execution by CPU 501.

Storage 504 may include any type of mass storage device configured to store information that CPU 501 may need to perform processes consistent with the disclosed embodiments. For example, storage 504 may include one or more magnetic and/or optical disk devices, such as hard drives, CD-ROMs, DVD-ROMs, or any other type of mass media device. Alternatively or additionally, storage 504 may include flash memory mass media storage or other semiconductor-based storage medium.

Database 505 may include one or more software and/or hardware components that cooperate to store, organize, sort, filter, and/or arrange data used by processing system and/or CPU 501. For example, database 505 may include historical data such as, for example, stored pattern LED pattern data that is used for relative state estimation. CPU 501 may also analyze current and previous path parameters to identify trends in historical data. These trends may then be recorded and analyzed to allow the airborne device 115 to more effectively navigate. It is contemplated that database 505 may store additional and/or different information than that listed above.

I/O devices 506 may include one or more components configured to communicate information with a user associated with the system shown in FIG. 5. For example, I/O devices may include a console with an integrated keyboard and mouse to allow a user to input parameters associated with processing system. I/O devices 506 may also include a display including a graphical user interface (GUI). In certain embodiments, the I/O devices may be suitably miniaturized and integrated with the system shown in FIG. 5. I/O devices 506 may also include peripheral devices such as, for example, a printer for printing information associated with processing system, a user-accessible disk drive (e.g., a USB port, a floppy, CD-ROM, or DVD-ROM drive, etc.) to allow a user to input data stored on a portable media device, a microphone, a speaker system, or any other suitable type of interface device. According to one embodiment, I/O devices 506 may be communicatively coupled to one or more monochrome cameras 117 and range finding devices in order to detect optical information transmitted by LEDs 152*a*-152*d* associated with target device 150.

Interface 507 may include one or more components configured to transmit and receive data via a communication network, such as the Internet, a local area network, a workstation peer-to-peer network, a direct link network, a wireless network, or any other suitable communication platform. For example, interface 507 may include one or more modulators, demodulators, multiplexers, demultiplexers, network communication devices, wireless devices, antennas, modems, and any other type of device configured to enable data communication via a communication network. According to one embodiment, interface 507 may be coupled to or include wireless communication devices, such as a module or modules configured to transmit information wirelessly using Wi-Fi or Bluetooth wireless protocols. Alternatively or additionally, interface 507 may be configured for coupling to one or more peripheral communication devices, such as wireless communication transceiver 417, 155.

Figure 6:
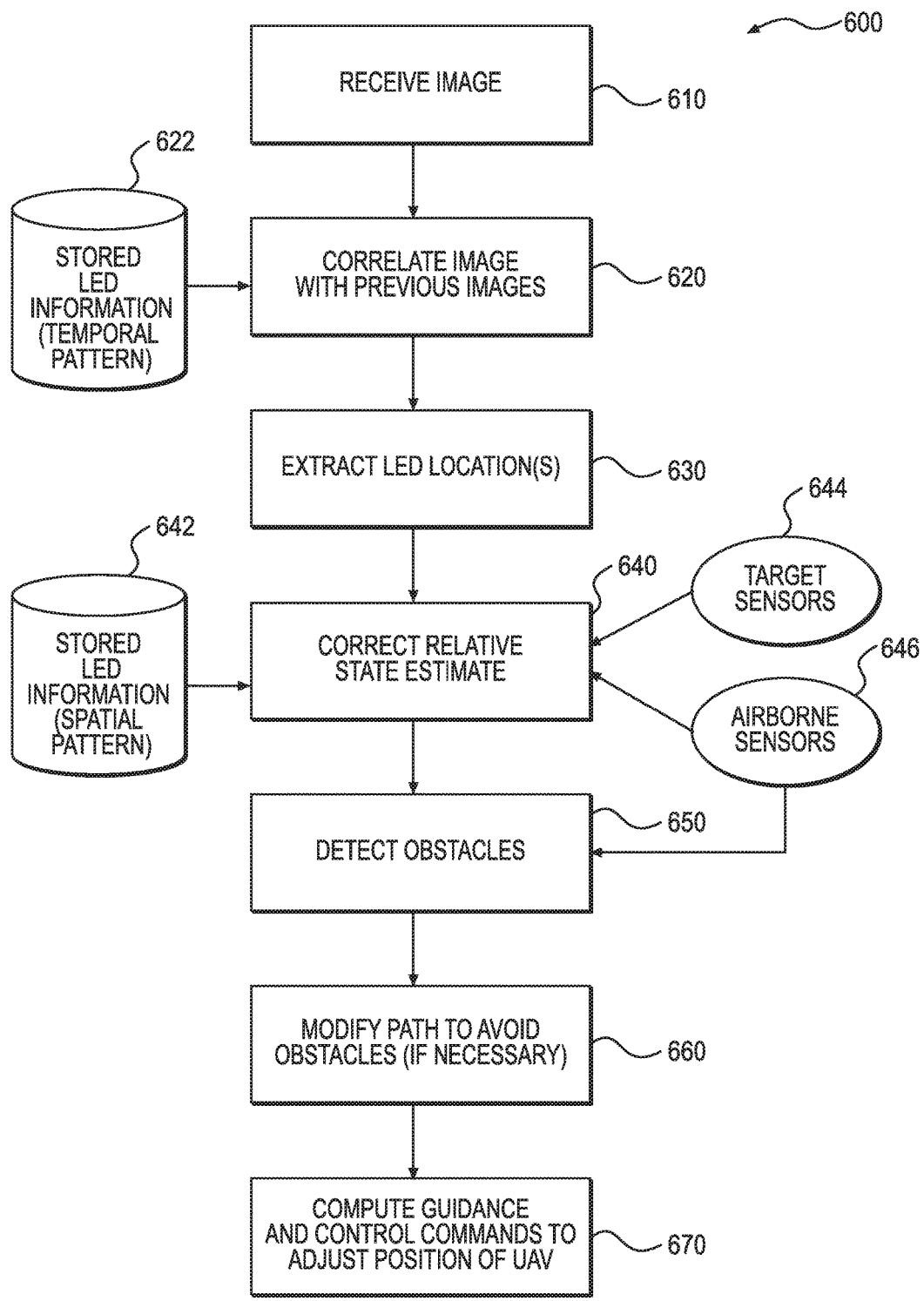
FIG. 6 provides a flowchart depicting an exemplary process to be performed by one or more processing devices associated with a system for navigating an unmanned aerial vehicle relative to a mobile target, in accordance with certain disclosed embodiments.

Systems and methods consistent with the disclosed embodiments are directed to solutions for tracking of a target object (whether mobile or stationary) by an airborne device, such as an unmanned aerial vehicle (UAV). More particularly, the processes and features disclosed herein provide a solution for allowing the airborne device to accurately and reliably follow a target device, while maintaining a generally constant relative distance from the target device and avoiding obstacles in the path of the airborne device. Exemplary features associated with the presently disclosed system include path prediction and collision avoidance schemes for adjusting the flight path of the airborne device during tracking of the target. One or more camera devices mounted on the airborne device are used for tracking of the target, as well as recording video of the target for various uses, such as security; intelligence, surveillance, and reconnaissance (ISR) activities, aerial search and recovery, and recreational use, all autonomously, without requiring specific user piloting activities. FIG. 6 provides a flowchart depicting an exemplary process to be performed by one or more processing devices associated with a system for navigating an unmanned aerial vehicle relative to a mobile target, in accordance with certain disclosed embodiments.

As illustrated in flowchart 600 of FIG. 6, the process may commence upon capture of an image by the airborne device camera. This image may be correlated with one or more of the previous images, with appropriate compensation for motion between the various capture times. The correlation process utilizes knowledge of the LEDs temporal pattern, such as flashing rate. The image correlation process results in the extraction of one or more LEDs associated with the target device.

The measured LED location(s) is then compared to the known spatial pattern of the LEDs on the target user. This information is used to correct the relative state estimate including position, velocity, and orientation. Additional sensor information from other sensors on the airborne device (IMU, Baro, Mag, GPS) is also used for this correction, if available. If sensor information is available from the target device (IMU, Baro, Mag, GPS), it is also use in the state correction.

The process may commence upon detection of at least one optical signal generated by an LED associated with a target device (Block 610). For example, an optical detector (such as a monochrome camera 117) of the airborne device 115 may detect at least one optical signal generated by an LED associated with the target device 150.

Upon detection of the optical signal, the received image data may be correlated with previous images based on stored or received LED information (temporal pattern) (Blocks 620, 622). The temporal pattern may have been configured by the user at the beginning of the use of the device, or it may be transmitted by the target device to the airborne device in real-time. Based on the correlation, the processor of the airborne device may extract LED locations in each image (Block 630).

The processor associated with the airborne device may correct relative state estimate based on information contained from the target sensors and airborne sensors and stored LED information (spatial pattern) (Blocks 640, 642, 644, 646). The spatial pattern may have been previously detected by the airborne device 115, or may have been calibrated by the user at the beginning of the use of the device.

Methods and processes disclosed herein may also include features for predicting movement of target device based on collaboration between the airborne device 115 and target device 150 (Blocks 644, 646). These processes are predicated on the collaboration and sharing of information between the airborne device processor and target device core sensors. Specifically, the airborne device processor may be configured to receive information indicative of position, orientation, acceleration, velocity, or altitude of the target 120 relative to the airborne vehicle 110. Furthermore, based on the current and previously received information indicative of position, orientation, acceleration, velocity, or altitude of the target 120 relative to the airborne vehicle 110, the airborne device 115 may be configured to predict a movement or infer a future path associated with the target.

As an alternative or in addition to path planning that may be performed, airborne device may also be configured to detect obstacle in the predicted path (Block 650). As explained, the perception required to detect obstacle during nominal flight can be constrained to a small volume of space driven by (1) vertically, the height difference between the airborne device 115 and target device 150; (2) laterally, a distance driven by size of the airborne device 115 and its ability to track lateral position; and (3) forward, a distance drive by the speed of the airborne device 115. A similar volume needs to be sensed in order to safely return to the perch position.

The position of the airborne device may then be adjusted to maintain the desired relative position and/or distance between the airborne device 115 and the target 150 (Block 660). As explained, processor 416 associated with airborne device 115 may be configured to control a motor or actuator associated with the airborne vehicle 110 in order to make modifications to the position of the airborne device relative to changes in the position of the airborne vehicle 110 and/or target 150 (Block 670).

Using this volumetric calculation scheme, reliably addressing the obstacle avoidance task then only requires one ranging sensor with limited range and scanning volume, something that can be accomplished with proximity and ranging sensors. According to one embodiment, the speed of the airborne vehicle 110 may be limited by the speed of the user, which will typically be under 5 m/sec for a dismounted user and 15 m/sec for off-road vehicles. Allowing a minimum time-to-collision of 3 sec requires obstacles to be detected up to about 60 m (allowing 1 sec to scan the entire volume). Such range is achievable with small laser rangefinders available today (e.g., PulsedLight Inc. LIDAR-Lite). By mounting this sensor on the pitch and yaw gimbal already hosting the camera, the necessary volume can be efficiently scanned, while also measuring the distance between airborne device 115 and target device 150.

The target user naturally detects and avoids obstacles, so he defines an obstacle-free path that the UAV can follow when necessary. If the UAV detects an obstacle along its current flight path, it will compute a path to connect it to the user-defined path, so it can follow in the footsteps of the target user until the obstacles disappear.

Using this prediction and obstacle detection information, airborne device may be configured to control a motor or actuator associated with the airborne vehicle 110 in order to make modifications to the position of the airborne device relative to changes in the position of the airborne vehicle 110 and/or target 150 (Block 640).

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It will be apparent to those skilled in the art that various modifications and variations can be made to the disclosed systems and methods for effectively and accurately navigating an unmanned aerial vehicle relative to a mobile target. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

INDUSTRIAL APPLICABILITY

By integrating the presently disclosed relative navigation system into an existing airborne devices, any small UAV can be transformed into a personal UAV that autonomously assists individuals or vehicles in real-time through its onboard payload. In addition to being downlinked to a centralized ground control station, the video feed from the UAV can be streamed directly to the individual or vehicle through a heads-up display (HUD), such as Google Glass. In certain scenarios the raw video feed may need to be distilled into actionable data for the user, similar to military systems available today. It is contemplated that automated video processing can be used extract features of interest (e.g. warm objects) and may be used to automatically alert the user during the performance of a mission (police patrol or pursuit, search-and-rescue operation, etc.).

Furthermore, the collaborative relationship facilitated by the bi-directional communication between the airborne device that is mounted on the UAV and the target device mounted on the target ensures that the UAV has access to both configuration and real-time information about its user. This enables the presently disclosed system to be robust to aggressive relative motion and to environmental disturbances, making it ideally suited to emergency responders and other applications involving highly-active, dynamic users (action sports, cinematography, military, etc.). For example, sensor data obtained by the airborne device from the target device may be used to (1) estimate relative velocity and acceleration (in addition to position) with high-accuracy and low-latency, (2) increase robustness to rapid relative motion in the navigation and machine vision algorithms, (3) provide robustness to varying lighting conditions in the machine vision algorithms, and/or (4) coast through short-term line-of-sight occlusions between UAV and user.

By exploiting the collaborative and following nature of this application, our system provides small UAVs with the accuracy and bandwidth necessary to tightly follow in the footsteps of its user while (1) being robust to aggressive relative motion and environmental disturbances and (2) avoiding obstacles. Key benefits of our approach compared to current state-of-the-art methods include: (1) designed for high-dynamics applications with robustness to motion and estimation of the entire relative state (position, velocity, acceleration) at low-latency; (2) fully addresses the obstacle avoidance challenge; (3) designed for the real-world with robustness to varying ambient lighting conditions, robustness to poor ambient magnetic environment (typical of low-altitude or indoor flight), and avoidance of complex machine vision (no SLAM, feature extraction and tracking, etc.); (4) high-accuracy, high-bandwidth navigation information that allows for tight UAV flight control laws; (5) high-availability of the navigation solution (GPS not required).

What is claimed is:

1. A method, comprising:
    causing an aerial vehicle to follow a flight path that positions the aerial vehicle at a perch position relative to a ground-based mobile target;
    detecting an obstacle in the flight path of the aerial vehicle;
    in response to detecting the obstacle, adjusting the flight path of the aerial vehicle to cause the aerial vehicle to reduce altitude from the perch position to connect to an obstacle-free path traversed by the ground-based mobile target; and
    causing the aerial vehicle to follow behind the ground-based mobile target on the obstacle-free path until the obstacle is no longer detected.

2. The method of claim 1, further comprising:
    determining that the obstacle is no longer detected; and
    in response to determining that the obstacle is no longer detected, adjusting the flight path of the aerial vehicle to cause the aerial vehicle to continue following the ground-based mobile target from the perch position.

3. The method of claim 1, wherein detecting the obstacle in the flight path of the aerial vehicle comprises monitoring a volume of space with a sensor on the aerial vehicle, wherein the volume of space has a height that corresponds to a height difference between the aerial vehicle and the ground-based mobile target.

4. The method of claim 1, further comprising before detecting the obstacle, causing the aerial vehicle to maintain a first following distance between the aerial vehicle and the ground-based mobile target.

5. The method of claim 4, further comprising after detecting the obstacle, causing the aerial vehicle to maintain a second following distance between the aerial vehicle and the ground-based mobile target along the obstacle-free path, wherein the second following distance is less than the first following distance.

6. The method of claim 4, wherein causing the aerial vehicle to maintain the first following distance comprises causing the aerial vehicle to maintain the first following distance to within a threshold range value.

7. The method of claim 1, wherein the ground-based mobile target includes a plurality of light emitting diodes (LEDs), and the method further includes detecting a plurality of optical signals from the plurality of LEDs to cause the aerial vehicle to follow the ground-based mobile target.

8. The method of claim 7, further comprising comparing a pattern defined by the plurality of detected optical signals from the plurality of LEDs with a previously-detected pattern to cause the aerial vehicle to follow the ground-based mobile target.

9. A system, comprising:
    a processor; and
    program instructions stored in a non-transitory computer readable medium and executable by the processor to:
        cause an aerial vehicle to follow a flight path that positions the aerial vehicle at a perch position relative to a ground-based mobile target;
        detect an obstacle in the flight path of the aerial vehicle;
        in response to detection of the obstacle, adjust the flight path of the aerial vehicle to cause the aerial vehicle to reduce altitude from the perch position to connect to an obstacle-free path traversed by the ground-based mobile target; and
        cause the aerial vehicle to follow behind the ground-based mobile target on the obstacle-free path until the obstacle is no longer detected.

10. The system of claim 9, further comprising a plurality of light emitting diodes (LEDs) coupled to the ground-based mobile target, wherein the plurality of LEDs are configured to emit a flashing pattern to assist the aerial vehicle in following the ground-based mobile target.

11. The system of claim 10, wherein the aerial vehicle comprises a monochrome camera configured to detect the flashing pattern from the plurality of LEDs.

12. The system of claim 10, wherein the flashing pattern is communicated wirelessly in real time to the aerial vehicle from a device on the ground-based mobile target.

13. The system of claim 10, wherein the ground-based mobile target comprises another vehicle.

14. The system of claim 10, wherein the processor and the non-transitory computer readable medium are part of a control system physically located on the aerial vehicle.

15. The system of claim 10, wherein the program instructions are further executable by the processor to:
    determine that the obstacle is no longer detected; and
    in response to the determination that the obstacle is no longer detected, adjust the flight path of the aerial vehicle to cause the aerial vehicle to continue following the ground-based mobile target from the perch position.

16. A non-transitory computer readable medium having stored therein instructions, that when executed by a processor, cause the processor to perform functions comprising:
    causing an aerial vehicle to follow a flight path that positions the aerial vehicle at a perch position relative to a ground-based mobile target;
    detecting an obstacle in the flight path of the aerial vehicle;
    in response to detecting the obstacle, adjusting the flight path of the aerial vehicle to cause the aerial vehicle to reduce altitude from the perch position to connect to an obstacle-free path traversed by the ground-based mobile target; and
    causing the aerial vehicle to follow behind the ground-based mobile target on the obstacle-free path until the obstacle is no longer detected.

17. The non-transitory computer readable medium of claim 16, the functions further comprising:
    determining that the obstacle is no longer detected; and
    in response to determining that the obstacle is no longer detected, adjusting the flight path of the aerial vehicle to cause the aerial vehicle to continue following the ground-based mobile target from the perch position.

18. The non-transitory computer readable medium of claim 16, wherein detecting the obstacle in the flight path of the aerial vehicle comprises monitoring a volume of space with a sensor on the aerial vehicle, wherein the volume of space has a height that corresponds to a height difference between the aerial vehicle and the ground-based mobile target.

19. The non-transitory computer readable medium of claim 16, the functions further comprising before detecting the obstacle, causing the aerial vehicle to maintain a first following distance between the aerial vehicle and the ground-based mobile target.

20. The non-transitory computer readable medium of claim 19, the functions further comprising after detecting the obstacle, causing the aerial vehicle to maintain a second following distance between the aerial vehicle and the ground-based mobile target along the obstacle-free path, wherein the second following distance is less than the first following distance.

* * * * *